(12) United States Patent
O'Connor et al.

(10) Patent No.: US 6,537,665 B2
(45) Date of Patent: Mar. 25, 2003

(54) NANO-SIZED DISPERSIBLE POWDERS AND METHOD OF MAKING

(75) Inventors: Thomas O'Connor, Albany, NH (US); Robert J. Nehring, Jr., Hopedale, MA (US); R. Andrew Russell, North Grafton, MA (US)

(73) Assignee: Nyacol Nano Technologies, Inc., Ashland, MA (US)

( * ) Notice: Subject to any disclaimer, the term of this patent is extended or adjusted under 35 U.S.C. 154(b) by 0 days.

(21) Appl. No.: 09/832,038

(22) Filed: Apr. 11, 2001

(65) Prior Publication Data

US 2002/0172827 A1 Nov. 21, 2002

(51) Int. Cl.$^7$ .................................................. B32B 5/16
(52) U.S. Cl. ........................ 428/402; 428/403; 428/404; 428/405; 428/406; 428/407; 516/53; 516/77; 516/80

(58) Field of Search ................................ 428/402, 403, 428/404, 405, 407, 406; 516/77, 80, 53

(56) References Cited

U.S. PATENT DOCUMENTS

| | | | | |
|---|---|---|---|---|
| 2,571,030 A | * | 10/1951 | Govett | 423/463 |
| 2,875,163 A | * | 2/1959 | Berridge | 521/91 |
| 3,252,917 A | * | 5/1966 | Mindick | 516/80 |

* cited by examiner

*Primary Examiner*—Leszek Kiliman
(74) *Attorney, Agent, or Firm*—Alvin Isaacs, Esq.

(57) ABSTRACT

A hydrophilic powder such as silica, adapted for dispersion in organic solvents and polymers, is provided with a coating over the outer surface of the powder particles to modify the surface characteristic from polar to non-polar or organophilic, whereby the thus coated powder is readily dispersible without agglomeration or enlargement of the powder particles. Preferred are nano-sized powders.

22 Claims, No Drawings

NANO-SIZED DISPERSIBLE POWDERS AND METHOD OF MAKING

BACKGROUND OF THE INVENTION

This invention relates to the commercially feasible preparation of solvent- and/or polymer-dispersible powders and, more particularly, to nano-sized powders of this description and polymers containing same. Since the invention is particularly directed to nano-sized silica powders, e.g., silica powders having a mean particle size from the order of about 2.0 nm to about 1000 nm, for purposes of illustration the following detailed description will be restricted thereto.

Initially, it is important to understand that, in the description of this invention "dispersible" in solvents and/or polymers means that the dispersed particles are not agglomerated and will possess substantially the same mean particle size as their ultimate particle size. In other words, the dispersed powders of this invention will uncharacteristically maintain their particle size distribution substantially free from "clumping" or agglomeration when employed in their end-use by incorporation in a polymer.

As technology responds to commercial needs, research finds ever-increasing uses of nano-sized particles as additives to polymeric films for a whole host of functions, namely as antiblocking additives, for controlling the coefficient of friction of the film, creation of a nano-composite structure possessing improved physical characteristics, including improved tensile and flexural strength, improved tensile modulus, improved barrier properties against transmission of water vapor, oxygen and/or carbon dioxide, enhanced abrasion resistance, and control of crystallization and nucleation in polymers.

In many of these contemplated uses, it is desired that the film containing the powder additive remain "effectively transparent", i.e., a film that is transparent to the eye if not entirely transparent to optical instruments for measuring transparency.

Typical powders made of nano-sized agglomerates are extremely difficult to disperse satisfactorily and do not normally disperse to the ultimate particle size of the powder.

This can, in turn, lead to loss of transparency, haze and/or poor physical properties. Silica particles in particular firm very strong bonds which are exceedingly difficult to break, when dried from water.

Iler and others have prepared silica organosols from which substantially dispersible silica powder reportedly can be made. However, the use of solvents and the preparation of powders by solvent drying is very costly and presents many cost and safety issues.

These characteristics frame the task of this invention, namely to provide powders, namely nano-sized powders which are free from agglomeration and will on dispersion retain their initial particle size distribution as colloidal sols. As mentioned above, This problem is critical, for example, when, as alluded to above, the polymer containing the dispersed powder for any of the functions heretofore mentioned is intended to provide an effectively transparent film.

BRIEF DESCRIPTION OF THE INVENTION

In accordance with this invention the task is solved in an elegant manner by modifying the polar or hydrophilic surface of the silica or other powder prior to dispersion to make the particle surface non-polar or organophilic.

For example, a negatively charged silica hydrosol is coated with a hydrous oxide providing a surface capable of reacting with an organic acid. Stability of the aqueous sol is preserved by reversal of the charge from negative to positive. The modified aqueous sol is then coated with an organic acid by treatment with an amphiphilic surfactant and the aforementioned organic acid. Upon drying, a powder is formed which is dispersible without agglomeration in non-polar solvents or into a polymer mix.

It will however be appreciated that if the powder particles are already positively charged, such as being colloidal or capable of reacting with an organic acid, the alumina first step can of course then be eliminated.

The thus coated powder particles may then be dispersed in a non-polar solvent for the contemplated polymers or dispersed directly in the polymer mix without danger of agglomeration and/or that the particle size would change from its initial nano size prior to dispersion.

DETAILED DESCRIPTION OF THE INVENTION

As previously discussed, the present invention is directed to nano-sized powders, i.e., powders having a mean particle size less than one micron, particularly silica powders which are to be dispersed in a solvent or in a polymer for its contemplated uses. The problem which is confronted is that on drying these very tiny particles will tend to agglomerate and to lose their initial nano identity which, in turn, will make them unsuitable for their intended usage.

As also previously stated, this problem which defines the task of the present invention is solved by coating the surface of the particles prior to dispersion with a coating system consisting of:

(1) a hydrous oxide coating capable of reacting with an organic acid; and (2) an overlayer of an amphiphilic surfactant and an organic acid or organic acid derivative.

A particularly useful procedure for providing the initial positively charged inorganic coating is that described and claimed in U.S. Pat. No. 3,252,917 issued May 24, 1966 to Mindick et al. entitled: METHOD OF PRODUCING ALUMINA-COATED SILICA IN SOL FORM.

As stated in Col. 2 of the patent:

"In its broadest aspects the invention comprises the discovery of a method of reacting certain acid, substantially salt-free silica sols with basic aluminum halides, allowing the reactants to remain in contact for sufficient time to coat the desired amount of alumina upon the silica particles, and finally contacting the coated sol product in a single step of ion exchange resin pass with a water insoluble anion exchange resin which has as its exchangeable anion, an anion of a weak volatile inorganic acid, to produce a substantially salt-free alumina-coated silica sol having a pH ranging from 4.5 to 6.5."

In Col. 3 under the heading "STARTING REACTANTS", it is first stated that the source of alumina is a starting material which has been defined as a basic aluminum halide which has been partly neutralized with a base or partially hydrolyzed, a preferred source of basic aluminum halide being the aluminum chlorhydroxy complex recited in U.S. Pat. Nos. 2,571,030 and 2,875,163.

Applicant considers this patent disclosure, including the patents recited therein, which disclosure is incorporated by reference herein, to be the preferred source of materials in the practice of the present invention. Specifically, as seen in the following illustrative examples, Applicant has chosen to select aluminum chlorhydrol as his preferred material for use in the practice of the present invention. However, it is to be expressly understood that the selection is a matter of function and any reagent which can modify the surface of the powder to change it from a surface of silanol groups to a surface reactive with the hydroxyl moiety of an organic acid without adversely affecting the nano-size distribution will be appropriate.

Other useful materials will be readily apparent to a person skilled in the art in the light of the instant disclosure and the objectives sought to be obtained by the present invention.

As mentioned above, the surfactant to be employed in this invention is an amphiphilic surfactant, i.e., a surfactant containing both polar water-soluble and hydrophobic water-insoluble substituents.

Since amphiphilic surfactants are per se well known in the art, the selection of the particular surfactant to be employed will be a matter of individual choice within the expected knowledge and judgment of the skilled worker. In any case, examples of particularly useful amphiphyles for the practice of the present invention include sodium dodecylsulfonate, sodium stearate and sodium dodecylsulfate.

Suitable illustrative organic acids contemplated for use in the practice of this invention include the saturated and mono-unsaturated higher fatty acids and their derivatives, e.g., oleic acid, stearic acid and palmitic acid, partially esterified phosphoric acid such as 03D (Albright & Wilson) and di-2-ethylhexyl phosphoric acid, etc.

For purposes of illustration only, the hydrous alumina-coated sol will have an alumina content equivalent to one to three atoms of aluminum per surface silicon atom in the sol. For example, a 50 nanometer sol will be ideally coated with hydrous alumina equivalent to 7.2 parts per hundred (pph) of silica. A 20 nanometer silica sol will have 18 pph alumina and a 100 nm silica sol 3.2 pph. The thus coated sol is deionized with an ion exchange resin that has been regenerated with sodium bicarbonate, e.g., IRA 67, 68, 400 and 904 from Rhom and Haas. The deionized alumina-coated sol at 20% concentration will have a specific conductivity of between 200 and 2000 micro Siemens, preferably 300–700 micro Siemens. The amphiphilic surfactant is present at one to twenty pph of the positively charged alumina coated silica sol, preferably between four and ten pph. The amount of organic acid is between one and twenty pph of the silica sol, preferably five to fifteen pph.

The following examples show by way of illustration and not by way of limitation the practice of this invention.

EXAMPLE 1

150.0 gms. of silica sol (pH 3.0–4.0) were diluted with water in a one liter beaker to provide a concentration of ~27% by weight. 204 grams of dilute aluminum chlorohydrol containing 23.7 grams of aluminum chlorohydrol and 180 grams of water were then added to the silica and stirred for ten minutes. 36.0 gms. of bicarbonate form IRA 67 (an ion exchange resin from Rohm & Haas) regenerated with sodium bicarbonate were added and the resulting mixture was then heated to ~85° C. with moderate stirring. The mixture was then allowed to cool. Then, 23.7 gms. of undiluted (concentrated) aluminum chlorohyrol were added and stirred for ~ten minutes. An additional 36.0 gms. of the ion exchange resin were next added. The mixture was heated to 85° C. while stirring, then cooled to room temperature after which the resin was removed. The pH was 6.5 and the conductivity was 480 micromhos/cm. The liquid was then filtered through a standard 11 micron filter (Whatman #11) to remove any microgels. Sodium dodecylbenzene sulfonate (surfactant) in an amount equal to 7.5 pph of the solids to be treated was dissolved in 490 cc of water. Then 12.5 pph of solids of 03D phosphoric acid ester (Albright & Wilson) were added to the aqueous solution of the surfactant and stirred for ~five minutes. Finally, the hydrous alumina-coated silica sol was added to the rapidly stirring mixture of surfactants and the resulting mixture was then spray dried in known manner at an inlet temperature of 400° F. and an outlet temperature of 200° F. to yield 180 gms of coated silica nano powder.

The dispersibility of the powder prepared in he foregoing illustrative example was tested by sonifying a 10% mixture of the powder in toluene. A transparent solution with blue opalescence was obtained, indicating excellent dispersibility.

EXAMPLE 2

A silica aqua sol treated with aluminum chlorohydrol, as in Example 1, was then treated with a mixture of sodium dodecylbenzene sulfonate and stearic acid in the following manner. Five cc of water containing 0.09 gm. of sodium dodecylbenzene sulfonate and 0.09 gm of stearic acid were heated to 65–70° C. to solubilize the stearic acid. The mixture was cooled to 35–40° C. and 4.26 cc of the alumina coated sol (containing one gm of solids) were added dropwise over ten minutes. The sample was mixed for an additional 30 minutes and then dried at 105° C. After lightly grinding the dried powder in a mortar with pestle, a 2% dispersion in toluene was prepared by sonification. The average particle size in the toluene, as determined with a Coulter N4 Particle Size Analyzer was 105 nm. The particle size of the starting silica hydrosol was 93 nm and after the alumina coating was applied the size was 106 nm. These results show that the powder dispersed in toluene was approximately equivalent to the starting alumina coated sol.

The coated powders of this invention can be incorporated as additives into various polymers by known techniques which per se do not constitute any part of this invention.

The following examples illustrate one method of incorporation into a polymer mix and the test data following this.

EXAMPLE 3

Haze and Blocking Force

The coated powder from Example 1 was extruded into Chevron 1122 low density polyethylene (LDPE) from a Leistritz ZSE27 extruder, Zones 1–3, 180° C., Zones 4–8 190° C., Zone 10 200° C. at a feed rat of 3.8 gms/minute; melt Temperature: 239° C., die pressure: 650 psi, vacuum: 16" Hg on vent port. Blown film was made at melt temp of 186° C. at letdowns of 0.1%, 0.3% and 0.5% active powder content at a thickness of 1 to 2 mils or 25 to 50 microns. For an LDPE control, at 0.1%, transmission at 500 nm was 91.4% and haze at 500 nm was 5.32%. As compared to the control, for the experimental of this Example, the transmission at 500 nm was 91.63%, while the haze was 5.32%, both readings being extremely favorable. The transmission and haze readings were also read at 0.3% and 0.5% for the Experimental, but not for the Control. The transmission and haze readings at 0.3% were 91.28% and 14.1%; and at 0.5% were 91.64% and 13.8%, respectively. The films were subjectively classified as being clear. The blocking force was measured after conditioning the films for three hours at 60° C. at a loading of 0.9 psi. The control gave an induced reblock force of 56 gms. Induced blocking force for the new powder was 13.9 gms at 0.3% and 12.8 gms at 0.5% indicating excellent antiblocking effectiveness. Microscopic examination of the films showed virtually all particles were dispersed and were not resolvable under an optical microscope at 800×.

EXAMPLE 4

Mechanical Testing

The coated powder from Example 1 was extruded in the Leistritz ZSE 27 at a melt temperature of 220° C. into Montell 6523 polypropylene at a concentration of 20%. The 20% concentrations were let down at 1.0%, 5.0% and 10.0% active powder concentrations. In addition, 5 mil cast films were made using a Brabender cast film unit. The films all exhibited excellent transparency at all three loadings and microscopic examination showed virtually no resolvable particles at 800× under the optical microscope.

Mechanical testing on the injection molded specimens showed the following results:

|  | 1% | 5% | 10% | Control |
|---|---|---|---|---|
| Tensile Strength | 4660 | 4486 | 4480 | 4762 |
| Tensile Modulus | 132140 | 148566 | 126300 | 125320 |
| Elongation at max force | 9.0 | 9.2 | 8.9 | 9.2 |
| Elongation at break | 27.2 | 78.5 | 79.6 | 21.1 |

From this data, it is readily apparent that the material properties of the polymer have been improved by the increase in modulus and elongation at break.

While the foregoing illustrative examples are restricted to polyolefins, it will of course be readily appreciated that the invention is not restricted thereto. Other polymers which can enjoy equal benefits from the invention include, for example, nylon, polyethylene terephthalate (mylar), ABS (acrylonitrile butadiene), polycarbonates, polystyrene, etc.

As has been stated throughout the foregoing description, the invention is particularly directed to nano silica powders and, for purposes of illustration has primarily been so restricted. However, Applicant wishes to stress what those skilled in the art will readily understand and appreciate, namely that the invention is not so restricted in scope to treatment of silica powders. The use in other commercial nano powders such as alumina, zirconia, zinc oxide, ceria, tin oxide, antimony, indium tin oxide, antimony tin oxide, titanium dioxide, etc. is also contemplated, again as will be readily understood by the skilled worker.

In like manner, it is to be expressly understood that while the foregoing discussion and illustrative examples are directed to single coatings, the invention is also applicable to mixed coatings.

Consistent with the definition of "dispersible" on page 1, second full paragraph under BACKGROUND OF THE INVENTION, expressions such as "fully dispersible" or "without any agglomeration or change in the particle size" is to be given reasonable interpretation as to include any slight agglomeration or particle size change that may be detectable under a microscope but would not reasonably be construed as any change in the particle size distribution of the powder.

Since certain changes may be made without departing from the scope of the invention, it is to be expressly understood that the foregoing description is by way of illustration and not by way of limitation; and the scope of the invention is as defined in the appended claims.

What is claimed is:

1. A particulate powder adapted for dispersion in organophilic solvents and in organophilic polymers, the particulate powder being prepared from a sol precursor for the powder,
   the outer surface of the powder particles having a first coating containing a reagent providing a surface reactive to an organic acid or an organic acid derivative; and
   a second coating covering the first coating, the second coating containing an amphiphilic surfactant and the organic acid or organic acid derivative reactable with the reagent in the first coating,
   the coated powder being characterized as being fully dispersible in the organophilic polymers or in organophilic solvents substantially free from any agglomeration of the powder particles and without any change of the particle size distribution of the sol precursor of the powder before drying of the precursor to prepare the particulate powder.

2. A particulate powder as defined in claim 1 wherein the ultimate particles possess a mean particle size of less than one micron.

3. A particulate powder as defined in claim 1 wherein the powder is silica.

4. A particulate powder as defined in claim 2 wherein the reagent in the first coating comprises a reagent reversing the charge on the powder particles from an initial negative charge to a positive charge.

5. A particulate powder as defined in claim 2 wherein the reagent in the first coating comprises a hydrous oxide reactable with an organic acid or an organic acid derivative.

6. A particulate powder as defined in claim 1 wherein the first coating providing a surface reactive to the second coating comprises aluminum chlorohydrol.

7. A particulate powder as defined in claim 1 wherein the powder is a nano-size silica powder; the first coating comprises a reagent reactable with an organic acid; and the second coating comprises an organic acid or an organic acid derivative and amphiphilic surfactant.

8. A powder as defined in claim 7 wherein the reagent in the first coating is a hydrous oxide.

9. A powder as defined in claim 7 wherein the reagent in the first coating is aluminum chlorohydrol.

10. An organophilic solvent having dispersed therein a particulate powder as defined in claim 1.

11. A solvent as defined in claim 10 wherein the powder particles are nano size.

12. A solvent as defined in claim 11 wherein the powder is silica hydrosol.

13. A solvent as defined in claim 11 wherein the reagent in the first coating makes the surface of the first coating reactable with an organic acid or an organic acid derivative; and the second coating comprises an organic acid or an organic acid derivative and an amphiphilic surfactant.

14. A solvent as defined in claim 13 wherein the reagent in the first coating comprises a reagent reversing the charge on the powder particles from an initial negative charge to a positive charge.

15. A solvent as defined in claim 13 wherein the first coating providing a surface reactive to the second coating comprises aluminum chlorohydrol.

16. A solvent as defined in claim 10 wherein the particulate powder dispersed therein is effectively transparent.

17. An organophilic polymer having dispersed therein a powder as defined in claim 1.

18. A polymer as defined in claim 17 wherein the powder particles are nano size.

19. A polymer as defined in claim 18 wherein the reagent in first coating makes the surface of the first coating reactable with an organic acid or an organic acid derivative; and the second coating comprises an organic acid or organic acid derivative and an amphiphilic surfactant.

20. A polymer as defined in claim 19 wherein the reagent in the first coating comprises a reagent reversing the charge on the powder particles from an initial negative charge to a positive charge.

21. A polymer as defined in claim 19 wherein the first coating providing a surface reactive to the second coating comprises aluminum chlorohydrol.

22. A polymer as defined in claim 17 wherein the polymer is a film and the particulate powder dispersed therein is effectively transparent.

* * * * *